March 20, 1962 G. HOHWART ETAL 3,025,736
ARBOR
Original Filed Feb. 9, 1953 3 Sheets-Sheet 2

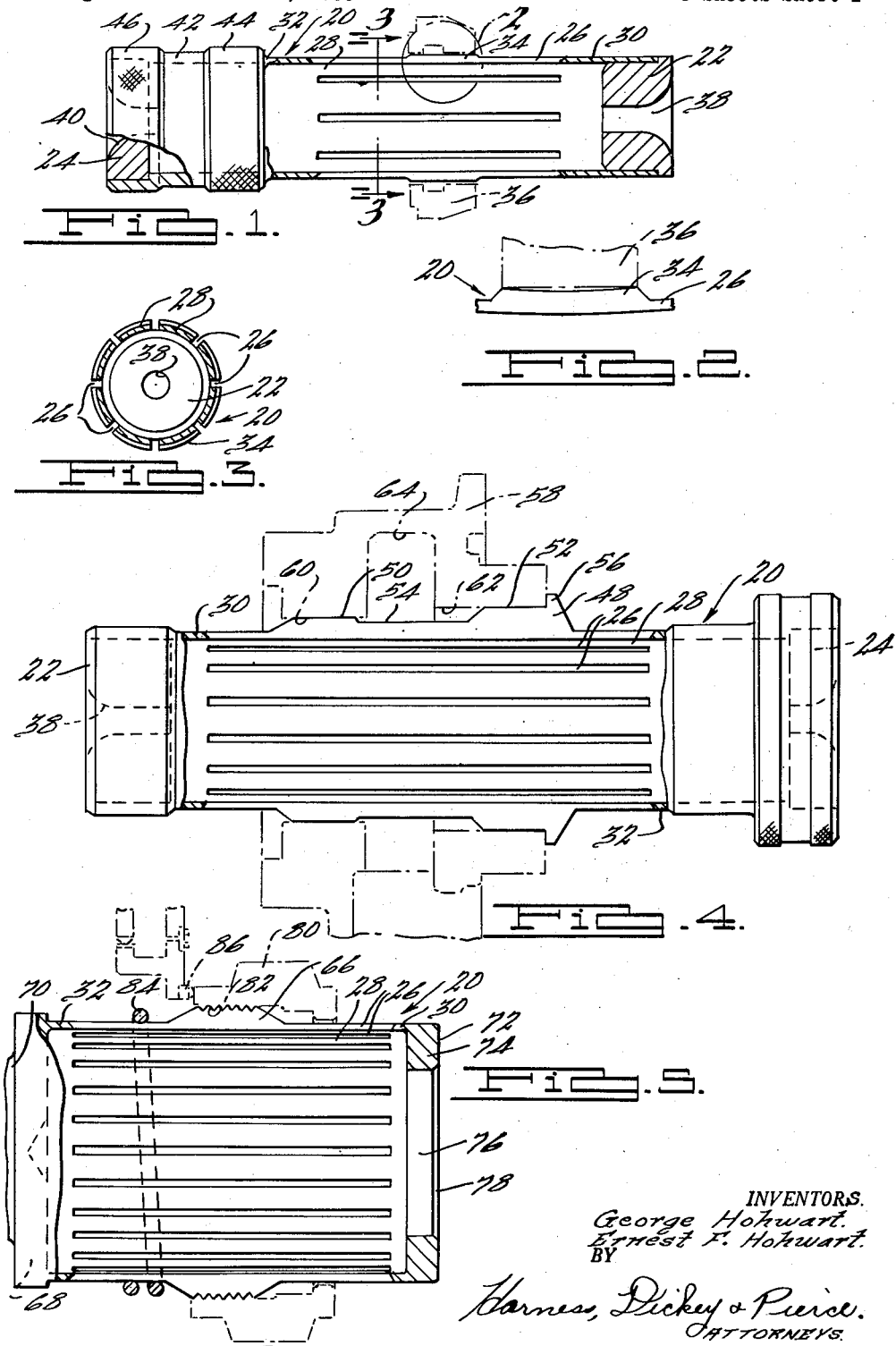

INVENTORS.
George Hohwart.
Ernest F. Hohwart.
BY
Harness, Dickey & Pierce,
ATTORNEYS.

INVENTORS
George Hohwart.
Ernest F. Hohwart.
BY Harness, Dickey & Pierce.
ATTORNEYS

United States Patent Office 3,025,736
Patented Mar. 20, 1962

3,025,736
ARBOR
George Hohwart, Farmington Township, Oakland County, and Ernest F. Hohwart, Detroit, Mich., assignors to N. A. Woodworth Company, Ferndale, Mich., a corporation of Michigan
Continuation of abandoned application Ser. No. 335,754, Feb. 9, 1953. This application Sept. 4, 1959, Ser. No. 838,359
20 Claims. (Cl. 82—44)

The invention relates to new and useful improvements in arbor chucks.

This is a continuation of our copending application Serial No. 335,754, filed February 9, 1953, now abandoned.

The device embodying the instant invention is an outgrowth of the development which led to the expansion arbor disclosed in our application Serial No. 119,192, filed October 1, 1949, which matured into Patent No. 2,626,811 on the 27th day of January, 1953. The arbor of this invention is used in the same general way and serves the same general function as the expansion arbor but the two arbors have different primary uses. The expansion arbor is a heavy-duty chuck adapted primarily for relatively large workpieces and is pre-eminently suited for gripping such workpieces exceedingly tightly. Also, the expansion arbor is relatively substantially more expensive than the instant device. The latter is adapted primarily for relatively small workpieces, although it can be used, if desired, for larger pieces as well. It is simpler in construction than the expansion arbor and accordingly is less expensive to manufacture. In addition, the device of this invention is superior to the expansion arbor in certain respects in that it accurately chucks a workpiece which is relatively short in length compared to its diameter. While the instant device can be adapted for either internal or external chucking, it is primarily adapted and pre-eminently suited to chuck a workpiece internally, viz., the arbor is inserted into a hole in the workpiece and when so inserted it grips the wall of the hole to hold the workpiece securely and centered properly on the arbor. When so used, the arbor provides a means for checking various physical characteristics of the workpiece and if desired it can be devised to grip the workpiece sufficiently tightly so that machining or other operations can be performed thereon. It is exceedingly difficult to chuck a workpiece in this manner if the hole in which the arbor is used is relatively short compared to its diameter. Such workpieces tend to cock on the arbor, and this is particularly true if pressure is applied thereto as by machining operations. The instant device is superior to any other chuck within our knowledge for holding workpieces of this type exactly centered.

From the foregoing it will be readily apparent that an important object of the present invention is to provide a chuck that is primarily adapted and pre-eminently suited for relatively small workpieces or for use in environments where a hole to be chucked is relatively short in length as compared to its diameter.

Another object of the invention is to provide an arbor chuck of the above-mentioned character that is relatively simple in construction and inexpensive to manufacture.

Other objects and advantages of the invention will be apparent during the course of the following description.

In the drawings forming a part of this specification and wherein like numerals are employed to designate like parts throughout the same:

FIG. 1 is a side elevational view of an arbor chuck embodying the invention, parts thereof being broken away and shown in section for clearness of illustration;

FIG. 2 is an enlarged view of the portion of FIG. 1 enclosed in the circle 2 and illustrating the manner in which the arbor chucks the workpiece to hold is securely and centered properly on the arbor;

FIG. 3 is a transverse, sectional view taken on the line 3—3 of FIG. 1;

FIG. 4 is a side elevational view of a modified arbor adapted to chuck a two-diameter hole in a workpiece, parts of the arbor being broken away and shown in section for clearness of illustration;

FIG. 5 is a side elevational view showing a modified form of the invention adapted particularly for threaded holes, parts thereof being broken away and shown in section;

Figure 6:
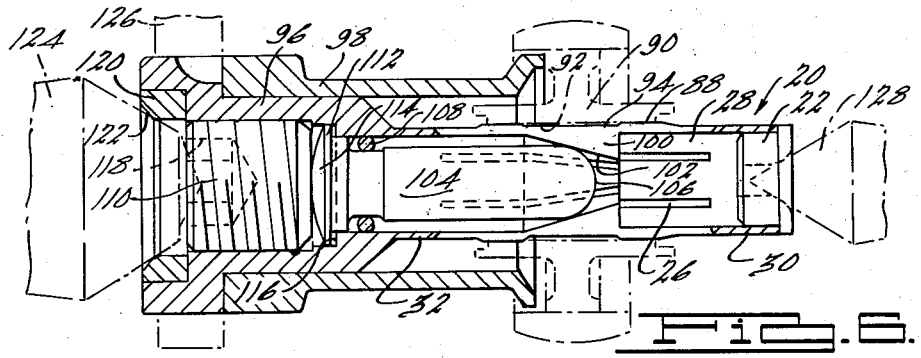
FIG. 6 is a longitudinal sectional view of still another modified form of the invention wherein the arbor is adapted to be expanded mechanically and held solidly against the workpiece to prevent relative movement between the arbor and the workpiece.

Considered in certain of its broader aspects the arbor chuck of this invention comprises a tubular body having a plurality of longitudinal slots spaced substantially uniformly around the circumference thereof and circumferentially continuous rigid portions at the ends of the slots. The slots define longitudinally extending radially flexible members therebetween. Because the flexible members are simply a part of the tubular body they are in the free state straight and parallel to the axis of the arbor. In order for the arbor to function as a chuck the flexible members are provided intermediate the ends and at one side thereof with embossments having work engaging surfaces disposed concentrically to the axis of the body. In the case of an internal chuck the embossments are on the outer sides of the flexible members and in the case of an external chuck the embossments are on the inner sides of the flexible members. In both forms the diameter of the body at the work engaging surfaces is different than the diameter of the workpiece to be chucked by the arbor. More specifically, the diameter of an internal chuck at the embossments is greater than the diameter of the hole to be chucked, and the diameter of an external chuck at the embossments is less than the external diameter of the part to be chucked. Thus, in both cases there is circumferential interference between the workpiece and the embossments when the flexible members are in their normal, free or relaxed state. Similarly, there is an interference fit between the embossments and the workpiece as the latter is pressed onto or into the chuck. Because of the interference fit the flexible members are flexed or arched to concave the work engaging surfaces as the workpiece is pressed into engagement with said embossments; the flexible members of the internal chuck are concaved inwardly and the flexible members of the external chuck are concaved outwardly. Because of the concave shape of the flexible members in use, the work engaging surfaces contact the workpiece separately at spaced points and are arched or spaced away from the workpiece intermediate their ends. In the case of an internal arbor, if the bore in the workpiece is longer than the work engaging surfaces of the embossments, the bore is located and contacted by the arbor on the opposite extreme ends of the embossments. On the other hand, if the length of the bore in the workpiece is shorter than the work engaging surfaces of the embossments, the bore is located and contacted by the embossments on the opposite extreme ends of the bore. Because the workpiece must be forced or pressed onto the arbor, the embossments are formed with tapered or beveled lead ends having a sufficient lead angle to guide the workpiece easily on to the embossments. The lead engagement end portions of the embossments extend from the flexible members to the work engaging surfaces of the embossments. In the case of an internal chuck, the diameter of the arbor at the juncture of the lead engagement portions and the flexible members is smaller than the minimum diameter of the workpiece to be chucked and the diameter of the arbor at the juncture of the lead engagement portions and the work engaging surfaces of the embossments is larger than the maximum diameter of the workpiece. Pressure is thus concentrated on the workpiece so as to retain the latter without tilting and precisely coaxial to the arbor. The above structure and mode of operation is true of every form of the invention herein illustrated and described, and it is this unique action of the flexible members when clamping the workpiece that produces the new mode of use and the beneficial results hereinabove described.

Referring first to the form of the invention shown in FIGS. 1-4 it will be observed that the arbor comprises a tubular body 20 having plugs 22 and 24 disposed in and snugly fitting the ends thereof. Intermediate the ends thereof, the body 20 is formed with an annular series of circumferentially spaced, longitudinal slots 26. As perhaps best shown in FIG. 1, the slots 26 are coextensive and they are sufficiently long to define inherently flexible and resilient members 28 therebetween. Any suitable number of slots 26 may be provided, and the number provided in any particular instance may vary, depending upon the size of the arbor and the function it is intended to perform. Eight slots are shown in the illustration here under consideration, and these slots are uniformly spaced as shown in FIG. 3 so that the eight members 28 are identical and have uniform properties and characteristics. It is significant that the slots 26 terminate substantial distances from the ends of the body 20 so as to leave circumferentially continuous rigid terminal portions 30 and 32 at both ends thereof. These terminal portions have constant size and form, and they maintain the flexible members 28 also normally constant in size and form and in identical, uniform spatial relation.

Each member 28 is provided on the outer side thereof with an embossment 34 and it will be observed that the leading ends of the embossments have tapered lead engagement portions for guiding a workpiece onto the embossments. The outer surfaces of the embossments 34 are curved around the center of the arbor as shown in FIG. 3, and inasmuch as the embossments are circumferentially aligned around the arbor they collectively define a raised band or ridge extending entirely around the body 20 at the middle of the flexible members 28, which band is interrupted or intersected by the slots 26. All of the embossments 34 are finished to an exact radial dimension.

In use, the arbor is inserted into the hole of a workpiece such as the one illustrated at 36, for example. The arbor is constructed so that the diameter of the body 20 at the flexible members 28 and at one terminal thereof is less than the diameter of the hole to be chucked but with the diameter of the body at the embossments 34 slightly greater than the diameter of the hole. Thus the body 20 is easily insertible into the hole of the workpiece until the embossments 34 engage the workpiece. At that point the arbor must be forced into the hole so that the embossments may enter. Since the embossments are larger in diameter than the hole, the embossments can only enter the hole by flexing the members 28 inwardly. The members 28 thus assume a concave or inverted barrel shape, as shown in FIG. 2. Manifestly, the embossments 34 are correspondingly arched so that each embossment engages the workpiece only at spaced points. In between these points the embossments are arched away from the workpiece. FIG. 2 illustrates the action which occurs but it will be appreciated that the condition of the arbor is exaggerated in the drawings to better illustrate the principle upon which the device operates. In actual practice, the middle of the embossments may clear the workpiece by only a few thousandths of an inch. However, regardless of the actual dimension, clearance is provided, and the embossments are pressed by resiliency inherent in the flexed members 28 outwardly against the workpiece at spaced points, and this phenomenon achieves decidedly beneficial results.

The particular relationship existing between the arbor and the workpiece in use is such that the workpiece is absolutely centered on the arbor and is held exactly at right angles to the axis of the arbor. This is true in the case of narrow as well as wide workpieces. In actual practice, workpieces in which the hole being chucked is approximately one third as long as its diameter are precisely located and positioned by the arbor. Thus the arbor can be used to determine whether the ends of the workpiece are exactly square with the axis of the hole in which the arbor is mounted or in any other capacity where a device of this nature has utility. When the arbor is removed from the workpiece, it automatically and immediately resumes its original size and form.

It will be readily apparent that the arbor automatically takes up part tolerances so that the one device will snugly fit any of a number of production parts even though these parts may vary individually within permissible production tolerances. Heretofore, it has been conventional to use a number of solid arbors varying in size to check all the parts or to use a long tapered arbor. When the latter expedient is used, the parts stop at various places on the taper, depending upon whether, and the extent to which, the part is oversize or undersize. This phenomenon decidedly affects the utility of the arbor adversely since the varying position of the piece on the arbor makes it difficult to perform a checking or other operation on the workpiece when supported by the arbor, and the taper of the arbor itself makes it difficult, if not impossible, to hold the workpiece with the center of the hole being chucked precisely coincidental with the center of the arbor.

In most instances, it is desirable to adapt the arbor for use between centers so that the device can be easily mounted on conventional machines for checking or other operations. To this end the plugs 22 and 24 are provided with precisely located inwardly tapered center holes 38 and 40.

In order to facilitate handling of the arbor in use, the tubular body 20 preferably is made longer at one side of the slots 26 than at the other and the relatively long portion is made relatively thicker as at 42 for additional strength. In the form of the invention here shown by way of illustration the big end of the arbor is formed with a pair of longitudinally spaced raised bands or ridges 44 and 46 which preferably are made integral with the body. The outer surfaces of the ridges 44 and 46 are knurled or otherwise roughened for ease in holding the arbor in use. The form of the invention shown in FIG. 4 is generally similar to the form of the invention first described, except that a modified embossment 48 is used having spaced outer surfaces 50 and 52 disposed different radial distance from the center of the arbor and relieved as at 54 therebetween. The arbor is larger in diameter at the supporting surfaces 52 than at the supporting surfaces 50, and the surfaces 52 are disposed remote from the end of the arbor which is inserted into the workpiece. Also, the surfaces 52 are formed with integral, radially extending stops or shoulders 56.

It will be observed that the workpiece 58 is provided with a two-diameter hole, the small portion 60 adapted to engage the surfaces 50 and the large portion 62 adapted to engage the surfaces 52 of the arbor. The two portions 60 and 62 of the workpiece are relieved as at 64 therebetween.

In use, the arbor is inserted into the workpiece 58 in the same manner as the arbor first described, and in this instance the arbor is pushed into the hole until the shoulder 56 engages the workpiece. In this manner, all workpieces are identically positioned on the arbor, and when the arbor is mounted in a checking machine or the like all the workpieces are identically presented to the checking member of the machine. Manifestly, this arbor has the same advantages as the arbor first described in that it will fit any of a number of production parts which differ dimensionally within production tolerances. Further, it makes no difference insofar as the operativeness of the arbor is concerned how the tolerances vary. For example, the arbor will fit a workpiece 58 in which the hole portion 60 is undersize and the hole portion 62 is oversize within permissible tolerances, as well as the workpiece in which the hole portion 60 is oversize and the hole portion 62 is undersize within permissible tolerances.

The form of the invention shown in FIG. 5 also is similar to the form of the invention shown in FIG. 1 except that modified externally threaded embossments 66 are provided and the arbor body itself is adapted for use as a permanent part of a checking machine or the like.

In the latter respect referred to above, one end of the arbor is made strong and rigid by a thick end wall 68 and the wall is provided with an axially extending shank 70. Only a fragmentary portion of the shank 70 is shown. It is contemplated that the shank 70 may be of any desired length and of any desired form. The primary purpose of the shank is to mount the arbor on a checking or other type machine and it will thus be apparent that the arbor may vary in both size and form depending upon the environment in which the arbor is adapted for use. It is intended that the arbor be suspended cantilever-fashion with the end 72 free so that the workpiece can be easily slipped onto the arbor from this end. Also, it will be observed that in this form of the invention the distal end 72 of the arbor is strengthened and made rigid by a relatively thick inturned flange 74. If desired, the flange 74 may be provided with a hole 76 having an outer bevel 78 adapted to receive a center or the like for supporting and steadying the otherwise unsupported end of the arbor.

When it is stated that the modified embossments 66 are externally threaded it is meant that the embossments are collectively threaded so that a workpiece 80 having an internally threaded hole 82 can be screwed onto the arbor as shown in the drawings. As in the forms of the invention first described, the embossments 66 are oversize with respect to the hole 82, and in this form of the invention suitable means preferably are provided for mechanically constricting or reducing the diameter of the arbor at the embossments prior to screwing the workpiece thereon. To this end, a flexible wire cable 84 or the like is wrapped around the arbor adjacent the embossment 66 and suitable means (not shown) are provided for selectively tightening and loosening the cable. For example, one end of the cable 84 can be anchored in any suitable manner and the other end attached to a manually operable lever or the like that can be manipulated to tension the cable. In any event, when the cable is tightened the flexible members 28 are simultaneously and uniformly arched inwardly to reduce the diameter of the arbor at the embossment 66. When the diameter of the arbor at the embossments is equal to or less than the diameter of the hole 32, the workpiece 80 can be easily screwed onto the arbor to the position shown in the drawings, and if the cable is then loosened inherent resiliency of the members 28 expands the arbor so that the external threads on the embossments 66 press solidly against the internal threads of the workpiece 80. However, since the arbor normally is larger in diameter at the embossments than the hole 82, the members 28 are arched inwardly, at least to some extent, even when the cable 84 is relaxed so that each embossment presses against the workpiece at longitudinally spaced points.

From the foregoing it will be readily apparent that this form of the invention functions in the same manner to achieve the same results as the forms first described. By reason of the pressure exerted by the arbor against the workpiece, the latter is chucked solidly on the pitch diameter of the thread. This makes it possible to perform a number of checking and machining operations on the work. For example, a workpiece chucked in the manner described can be easily checked to determine whether an end face of the workpiece is square with respect to the axis of the hole or the pitch diameter of the thread. This operation is illustrated in the drawings wherein a conventional checking member 86 is shown in engagement with one end of the workpiece 80. When the arbor is rotated to turn the workpiece 80 with respect to the checking member 86, it can be readily determined whether the end engaged by the member 86 is square with the rotational axis of the arbor and consequentially with the axis of the hole in which the arbor is mounted.

FIG. 6 shows still another modified arbor construction adapted to hold a workpiece solidly so that a machining or other operation can be performed thereon. In this connection it will be apparent that any machining operation exerts pressure on the workpiece which tends to move the latter either axially or rotatably on the arbor, and if the machine operation is to be performed successfully some means must be provided for preventing such relative movement.

Specifically, the arbor shown in FIG. 6 is generally similar to the form first described but the flexible members 28 are formed with modified embossments 88 which are adapted to accommodate a workpiece 90 having a relatively long hole or bore 92. It will be observed that the embossments 88 are made correspondingly longer; and when the embossments are lengthened to the extent shown, they preferably are relieved in the middle, as at 94. Also, in this form of the invention the big end of the arbor is relatively thickwalled, as at 96, and a sleeve 98 on and snugly fitting the portion 96 projects axially to provide a stop for the workpiece 90.

In order to lock the workpiece 90 on the arbor, the members 28 are formed substantially midway of the embossments 88 with internal cam members 100 having cam surfaces 102 disposed concentrically around the axis of the arbor and tapered toward one end thereof. In the form of the invention shown, the cam surfaces 102 are tapered toward the end of the arbor which is adapted for insertion into the workpiece, and the relatively thick wall opposite end 96 of the arbor mounts means for applying pressure against the cam members. More specifically, a push shaft 104 is slidably mounted in the arbor and the shaft has a rounded end 106 which simultaneously engages the cam surfaces 102. An O-ring 108 supports the shaft 104 for free sliding movement in the arbor and also serves the function of sealing the operating parts of the chuck to the left of the ring as viewed in the drawings from dirt and grit that may enter the arbor through the slots 26. A pressure screw 110 mounted in the arbor behind the shaft bears against the latter to press it solidly against the cam surfaces 102 so as to press the flexible members 28 solidly outwardly against the workpiece 90. The push shaft 104 preferably is formed with an enlarged head 112 having a spherically curved end surface 114 which seats against the inner end of the pressure screw 110 so as to reduce the area of engagement and consequentially the resistance to turning of the screw. Also, the bore of the arbor is enlarged to accommodate the head 112 and the enlarged portion of the bore defines a radial shoulder 116 which limits forward movement of the shaft 104 and thus prevents inadvertent over-stressing of the flexible members 28. Any suitable means may be provided for rotating the pressure screw 110, and the latter is here shown provided with a socket 118 for receiving a conventional Allen wrench. A hardened ring 120 set into the arbor behind pressure screw 110 has a tapered outer surface 122 adapted to receive a suitable center 124. A driver designated generally at 126 fixed to the arbor body is used in the conventional manner to rotatively drive the arbor and the workpiece mounted thereon when the arbor is mounted between centers 124 and 128 as shown.

The pressure screw 110 normally is retracted to release the push shaft 104 so that the flexible members 28 function in the same manner as in the forms of the invention hereinabove described. The workpiece 90 can then be pushed onto the arbor to flex the members 28 inwardly as in the other forms of the invention. However, inasmuch as the inherent resiliency of the members 28 may not be sufficient to hold the workpiece stationary with respect to the arbor if a machining, grinding or other operation is to be performed on the work, it is desirable, and in many instances necessary, to amplify the normal inherent holding power of the members. This is accomplished in the invention here under consideration by tightening the pressure screw 110 against the push shaft 104 to force the latter solidly against the cam surfaces 102. Pressure exerted in this manner against the cam surfaces presses the members 28 radially outwardly against the work and effectively locks the latter on the arbor. The arbor, with the workpiece mounted thereon, can be then placed between centers 124 and 128 as shown in the drawings and the arbor rotatively driven in the usual way to rotate the workpiece 90. The workpiece is held properly centered on the arbor and the end faces of the work can be machined exactly at right angles with respect to the axis of the hole in which the arbor is mounted. Also, it will be readily apparent that other operations can be easily performed on the workpiece in predetermined relation to the center of the hole 92.

Figure 7:
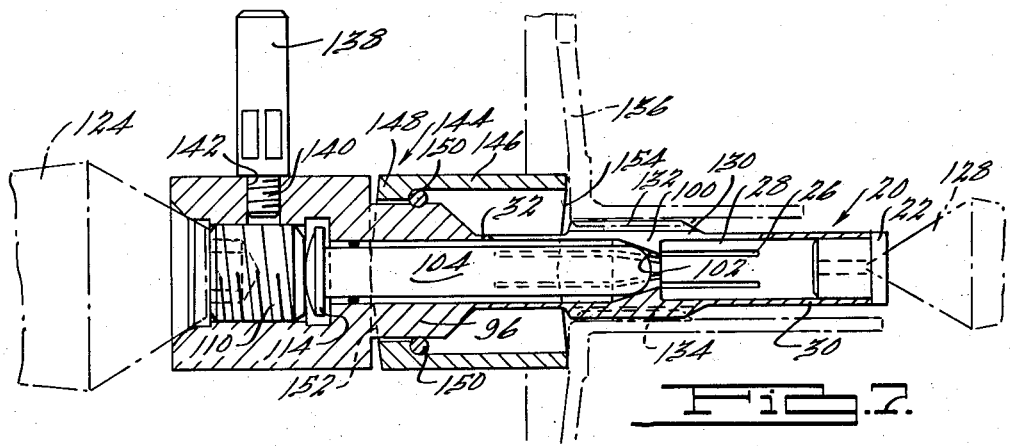
FIG. 7 is a longitudinal sectional view showing another mechanically expanded form of the invention adapted primarily for splined holes in a workpiece.

Reference is now had to the form of the invention shown in FIG. 7 which illustrates a modified arbor construction adapted for internally splined workpieces. This form of the invention is similar to the form shown in FIG. 6 except that the flexible members 28 have comparatively elongated embossments 130 provided with longitudinal splines 132 which are formed and spaced around the circumference of the arbor to interfit with the internal splines 134 of a workpiece 136. The instant device also has a modified driver comprising an elongated rod or pin provided with a longitudinally extending threaded stud 140 screwed into a correspondingly internally threaded hole 142 provided in the big end of the arbor. The driver 138 is more or less conventional in construction and functions in an obvious manner to rotatably drive the arbor when the latter is mounted for rotation on the centers 124 and 128.

Also it will be observed that the arbor now under consideration is provided with a modified stop 144 which is particularly adapted and primarily intended for use with workpieces so formed that the radial face which engages the stop is not at right angles to the axis of the hole being chucked. It should be understood in this connection, however, that while the stop 144 is particularly adapted for the environment described, it is not limited thereto but can be used with any type workpiece, and it makes no difference whether the face of the workpiece engaged by the stop is at right angles or tapered with respect to the axis. Specifically, the stop 144 comprises a tubular sleeve 146 having a relatively narrow inturned flange 148 at the rearward end thereof which surrounds and is spaced from the portion 96 of the arbor. The sleeve 146 sungly fits and is held in coaxial relation with the arbor by a band of flexible material such as the O-ring 150 surrounding the arbor. The rearward end of sleeve 146 is formed with a flat taper, as at 152, and the forward end thereof is formed with a correspondingly flat taper 154. The two tapers 152 and 154 are disposed at right angles with respect to each other so that a double rocking action is provided for the stop 144. In the drawings, the ridge defined by the flat taper 152 extends horizontally of the arbor, and the ridge defined by the taper 154 extends vertically of the arbor. Thus the stop 146 has a line engagement with the workpiece 136, and the universal movement provided by the tapered ends 152 and 154 permits the stop to adapt itself readily to the workpiece.

It is obvious from the drawings that the arbor can be mechanically expanded against the workpiece 136 in the same manner as the arbor illustrated in FIG. 6 and that except for the differences noted above, the arbor functions in the same manner to achieve the same results as the arbor last described.

Figure 8:
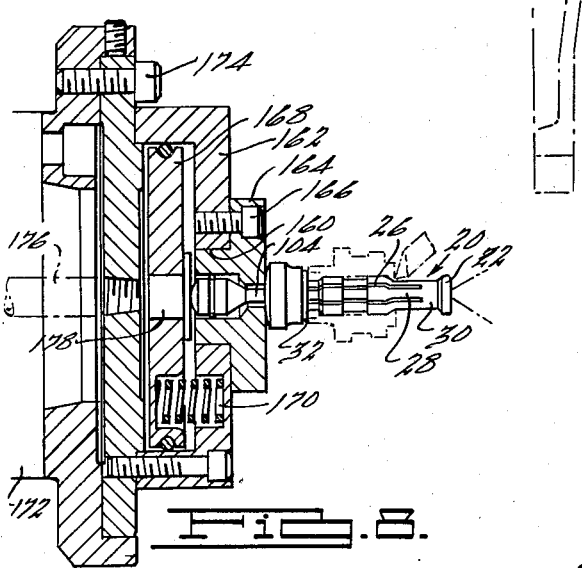
FIG. 8 is a side elevational view showing an arbor chuck embodying the invention operatively associated with and adapted to be mechanically expanded by a power piston, the arbor being shown in elevation and the piston and its adjuncts being shown in section.
Figure 9:
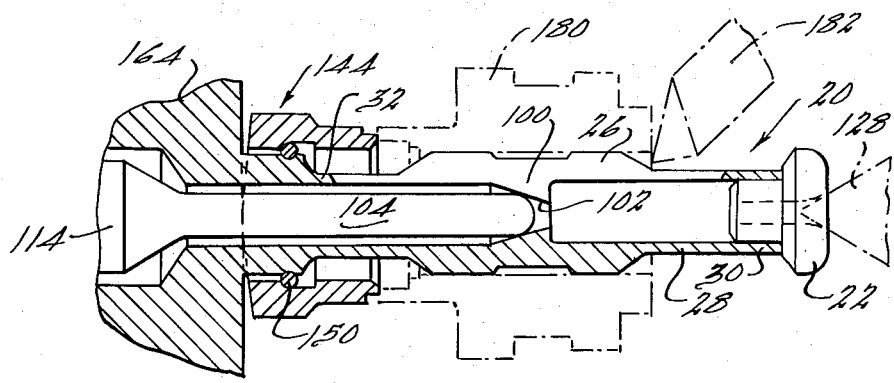
FIG. 9 is a fragmentary, enlarged view showing the arbor illustrated in FIG. 8 in longitudinal section.

Reference is now had to FIGS. 8 and 9 which show an arbor adapted to be mechanically expanded and locked against the workpiece by a power actuator. More specifically, the arbor now under consideration is similar to the arbor illustrated in FIG. 6 and is equipped with a double rocking stop 144 similar to the one illustrated and described in connection with the form of the invention shown in FIG. 7. Also, in this form of the invention the big end of the arbor body fits snugly in an opening 160 provided centrally in a fluid cylinder 162. A radial flange 164 on the arbor body is fastened securely to the cylinder 162 by screws 166. A power piston 168 is mounted for reciprocation in the cylinder 162 and the piston is normally retracted by springs 170 in the cylinder ahead of the piston. In the particular environment shown in the drawing, the cylinder 162 is fastened to a rotatably driven spindle 172 of a machine tool (not shown) by screws 174. Fluid under pressure is supplied to the cylinder behind the piston in the usual manner from any suitable source through a pipe 176. According to the present invention, the power piston 168 replaces the pressure screws 110 shown in FIGS. 6 and 7, and to this end the head of the push shaft 104 is lengthened so that it extends into the cylinder 162 and butts against the hardened head of a pin 178 embedded centrally in the piston.

Initially in the operation of the arbor, fluid to the cylinder 162 is shut off so that the springs 170 retract the piston and permit the push shaft 104 to release the cams 100 so that the flexible members 128 assume their normal straight or rectilinear position. With the parts thus positioned, a workpiece 180 can be readily slipped onto the arbor to engage the stop 144. Fluid under pressure is then admitted to the cylinder 162 behind piston 168 to advance the latter against the push rod 104. The latter then advances against the cam 100 to expand the flexible members 28 against the workpiece so as to lock the arbor on the workpiece. In this connection, it will be observed that the head of pin 178 seats against the arbor body to limit forward travel of the piston 168 and to prevent overstressing of the arbor. In the drawings a cutting tool 182 is shown at the forward end of the workpiece 180 to illustrate a typical machining operation that can be performed on the workpiece when the latter is clamped in the manner described. If desired, the distal end of the arbor can be supported by a tailstock center 128 as shown in the drawings.

Figure 10:
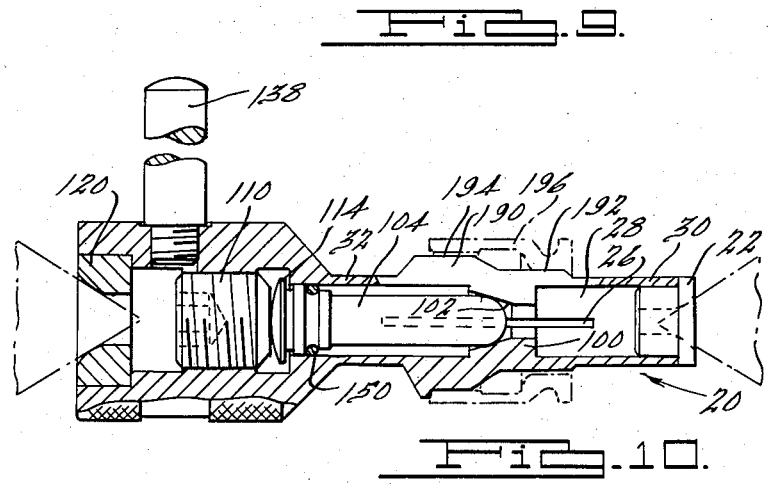
FIG. 10 is a longitudinal sectional view showing a modified arbor construction embodying the invention adapted to chuck a two-diameter hole and to be mechanically expanded so as to lock the workpiece solidly for a machining or other operation.

Reference is now had to FIG. 10 which shows an arbor similar in all material respects to the arbor illustrated in FIG. 6 except that the flexible members 28 have differently formed embossments 190. In this form of the invention each embossment has two separate levels 192 and 194 disposed different distances from the center of the arbor in the same manner and for the same reasons as the surfaces 50 and 52 referred to in connection with the form of the invention illustrated in FIG. 4. Also, it will be observed that the instant construction is formed with internal cam members 100 having cam surfaces 102 disposed substantially midway between the two external work-supporting surfaces 192 and 194 in the same manner as the modification illustrated in FIG. 6. It is a feature of the instant modification, however, that alternate surfaces 192 and alternate surfaces 194 are relieved and that the total relieved surfaces are staggered around the circumference of the arbor. This is necessary inasmuch as the workpiece 196 has two separate internal surfaces that must be engaged by the arbor, and each of these surfaces may vary in size independently of the other. In other words, both of the holes to be chucked may be oversized or both may be undersized or one hole may be oversized and the other hole may be undersized. The arbor must adapt itself to all of these conditions. We have found that this can be done efficiently if the supporting surfaces 192 and 104 are relieved and the relieved surfaces are staggered in the manner described. Only one supporting surface on each flexible member 28 contacts the workpiece 196, and adjacent members 28 engage opposite diameters of the work. Thus, if one diameter of the work is oversize and the other diameter is undersize, the inherent resiliency of the arbor will cause the members 28 which engage the oversize diameter to spring away from the push shaft 104. The other members, however, which cooperate with the undersize diameter of the work will be engaged by the push shaft 104 and the latter will apply pressure against these members to lock the same solidly with the work. It will thus be apparent that all of the members 28 mutually cooperate to locate and hold the work and that those members which engage the relatively smaller diameter of the work will coact with the push shaft 104 to lock the workpiece on the arbor. Manifestly, it makes no difference which diameter of the work is relatively large and which is relatively small. The push shaft 104 is actuated by pressure screw 110 as in the forms of the invention shown in FIGS. 6 and 7 but will be readily understood that any other suitable type of actuator can be employed such for example as the fluid cylinder and piston arrangement shown in FIGS. 8 and 9.

It is believed that the mode of operation and use of the arbor will be apparent from the foregoing description.

Figure 11:
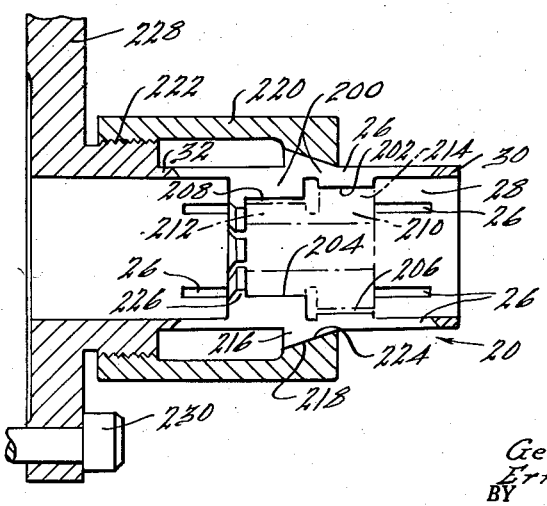
FIG. 11 is a longitudinal sectional view showing an arbor chuck to surround and externally chuck a workpiece.

The form of the invention shown in FIG. 11 operates on the same principle as the form illustrated in FIG. 10 but it is modified to chuck a two-diameter workpiece externally rather than internally. To this end the flexible members 28 are formed with internal embossments 200, each having work-supporting surfaces which may be either 202 or 204. All the work-supporting surfaces 202 and all the work-supporting surfaces 204 are disposed concentrically around the axis of the arbor but the surfaces 202 are spaced radially farther from the axis than the surfaces 204. Alternate surfaces 202 are relieved as indicated at 206 and alternate surfaces 204 relieved as indicated at 208. Also, as in the form of the invention shown in FIG. 10, alternate surfaces 202 and 204 are relieved around the circumference of the arbor. As shown in the drawings, the arbor is adapted to chuck a workpiece 210 having a relatively small-diameter portion 212 and a relatively large-diameter portion 214. The workpiece 210 is adapted to be inserted into the arbor as illustrated in the drawings and when so inserted the relatively small portion 212 seats against the unrelieved supporting surfaces 204 and the relatively large portion 214 seats against the unrelieved surfaces 202.

Inasmuch as the arbor is adapted to chuck the workpiece externally, external cam members 216 are provided on the flexible members 28 and the cam members are disposed axially between the supporting surfaces 202 and 204. The cam members 216 have cam surfaces 218 which taper toward the distal end of the arbor, and a sleeve 220 surrounding and threaded on the arbor at 222 has an internal cam surface 224 which seats against and simultaneously engages cam members 216. It will be readily apparent that when the sleeve 220 is tightened, the internal cam surface 224 thereof presses simultaneously against the cam members 216 to press the members 28 inwardly against the workpiece whereby to lock the latter securely against independent rotation in the arbor. Conversely, when the sleeve 220 is loosened, the cam surface 224 releases and ultimately disengages the cam members 216 permitting the flexible members 28 to relax their grip on the workpiece 210 so that the latter can be readily removed from the arbor.

If desired, suitable stop means can be provided for limiting insertion of the workpiece into the arbor and for positioning the workpiece properly with respect to the work-engaging surfaces 202 and 204. In the form of the invention here shown, the flexible members 28 are provided at the inner ends of supporting surfaces 204 with radially inwardly extending stops 226 which perform this function.

The arbor body illustrated in the drawings is formed at the big end thereof with a radial flange 228 which is adapted for attachment by screws 230 to any suitable mounting. The arbor may be adapted for mounting on a face plate or on the end of a spindle as shown in connection with the form of the invention illustrated in FIGS. 8 and 9. Also, it will be readily apparent that the means for exerting pressure against the flexible members 28 to lock the workpiece 210 securely in the arbor can be adapted for hand operation as illustrated or it can be adapted for power operation as shown in FIGS. 8 and 9.

The mode of operation and use of this form of the invention will be apparent from the foregoing description.

What is claimed is:

1. An arbor chuck comprising a tubular body of a diameter to loosely receive a workpiece to be chucked, said tubular body having a plurality of longitudinal slots spaced substantially uniformly around the circumference thereof and circumferentially continuous rigid portions at the ends of said slots, said slots defining longitudnial radially flexible members, embossments on one side of said flexible members substantially midway between the ends thereof, said embossments having peripheral work engaging surfaces, the diameter of said tubular body at said embossments providing an interference fit with a workpiece to be chucked thereby, whereby the workpiece must be forced onto said embossments in chucking and in so doing stresses said flexible members and said embossments into arcuate form with said flexible members and said embossments arched in the same direction, each embossment in the stressed condition being at the bottom of and facing inwardly from the arch of its respective flexible member and the work engaging surface of said embossments being concave to engage the workpiece at axially spaced points to hold said workpiece without tilting and precisely coaxial to said tubular body.

2. An arbor chuck comprising a tubular body of a diameter to loosely receive a workpiece to be chucked, said tubular body having a plurality of longitudinal slots spaced substantially uniformly around the circumference thereof and circumferentially continuous rigid portions at the ends of said slots, said slots defining longitudinal radially flexible members, embossments on one side of said flexible members substantially midway between the ends thereof, said embossments having peripheral work engaging surfaces, the diameter of said tubular body at said embossments providing an interference fit with a workpiece to be chucked thereby, whereby the workpiece must be forced onto said embossments in chucking and in so doing stresses said flexible members and said embossments into arcuate form with said flexible members and said embossments arched in the same direction, each embossment in the stressed condition being at the bottom of and facing inwardly from the arch of its respective flexible member and the work engaging surface of said embossments being concave to engage the workpiece at axially spaced points to hold said workpiece without tilting and precisely coaxial to said tubular body, and means for collectively uniformly stressing said flexible members in a direction to facilitate engagement of said embossments with said workpiece.

3. An arbor chuck comprising a tubular member of a diameter to loosely receive a workpiece to be chucked, embossments on said tubular member intermediate the ends thereof having peripheral work engaging surfaces, said tubular member having longitudinal slots extending through said embossments and terminating short of the ends of said tubular member and substantially equidistant from opposite ends of said embossments, said slots defining flexible members having embossments, at substantially the middle thereof, the diameter of said arbor at said embossments providing an interference fit with a workpiece to be chucked thereby and said embossments having beveled ends leading to said work engaging surfaces for guiding a workpiece onto said embossments, whereby a workpiece must be forced onto said embossments in chucking and in so doing stresses said flexible members and said embossments into arcuate form with said flexible members and said embossments arched in the same direction, each embossment in the stressed condition being at the bottom of and facing inwardly from the arch of its respective flexible member and having a concave work engaging surface engageable with the workpiece at axially spaced points to retain the workpiece without tilting and precisely coaxial to the arbor.

4. An external arbor chuck adapted to chuck the outside circumference of a workpiece comprising a tubular member having an internal diameter larger than the outside diameter of the workpiece to be chucked, internal embossments on said tubular member intermediate the ends thereof having peripheral work engaging surfaces, said tubular member having longitudinal slots extending through said embossments and terminating short of the ends of said tubular member and substantially equidistantly from opposite ends of said embossments, said slots defining flexible members having embossments at substantially the middle thereof, the diameter of said arbor at said embossments being normally smaller than the minimum outside diameter of said workpiece to provide and assure an interference fit between the embossments and said workpiece, whereby a workpiece must be forced into said arbor and onto the work engaging surfaces of said embossments and in so doing stresses said flexible members and said embossments into arcuate form with said flexible members and said embossments arched in the same direction, each embossment in the stressed condition being at the bottom of and facing inwardly from the arch of its respective flexible member and having a concave work engaging surface engageable with the workpiece at axially spaced points to retain the workpiece without tilting and precisely coaxial to the arbor.

5. An internal arbor chuck adapted to chuck the bore of the workpiece comprising a tubular member of a diameter to fit loosely within the bore of the workpiece to be chucked, external embossments on said member intermediate the ends thereof having peripheral work engaging surfaces, said tubular member having longitudinal slots extending through said embossments and terminating short of the ends of said tubular member and substantially equidistantly from opposite ends of said embossments, said slots defining flexible members having embossments at substantially the middle thereof, the diameter of said arbor at said embossments being normally larger than the maximum diameter of the bore in said workpiece to provide and assure an interference fit with the workpiece, said embossments having beveled ends leading to said work engaging surfaces for guiding the workpiece onto said work engaging surfaces, whereby the workpiece must be forced onto said embossments in chucking and in so doing stresses the flexible members into arcuate form with said flexible members and said embossments arched in the same direction, each embossment in the stressed condition being at the bottom of and facing inwardly from the arch of its respective flexible member and having a concave work engaging surface engagable with the workpiece at axially spaced points to retain the workpiece without tilting and precisely coaxial to the arbor.

6. An arbor chuck comprising a tubular member of a diameter to loosely receive a workpiece to be chucked, embossments on one side of said tubular member and intermediate the ends thereof, having peripheral work engaging surfaces, cams on the other side of said tubular member opposite said embossments, said tubular member having longitudinal slots extending through said embossments and said cams terminating short of the ends of said tubular member and substantially equidistantly from opposite ends of said embossments, said slots defining flexible members having said embossments and said cams at substantially the middle thereof, the diameter of said arbor at said embossments providing and assuring an interference fit with a workpiece to be chucked thereby, said embossments having beveled ends leading to said work engaging surfaces for guiding a workpiece onto said embossments, whereby a workpiece must be forced onto said work engaging surfaces when chucking and in so doing stresses said flexible members and said embossments into arcute form with said flexible members and said work engaging surfaces arched in the same direction, each embossment in the stressed condition being at the bottom of and facing inwardly from the arch of its respective flexible member and having a concave work engaging surface engageable with the workpiece at axially spaced points to retain the workpiece without tilting and precisely coaxial to the member, said cams adapted to transmit pressure exerted there against in the direction of said embossments whereby to press the latter solidily against a workpiece disposed thereon.

7. An arbor chuck comprising a tubular member of a diameter to loosely receive a workpiece to be chucked, said tubular member having a plurality of longitudinal slots spaced substantially uniformly around the circumference thereof and circumferentially continuous rigid portions at the ends of said slots, said slots defining longitudinally extending radially flexible members, embossments on one side of said flexible members substantially midway between the ends thereof, cam members on the other side of said flexible members opposite said embossments, the diameter of said tubular members at said embossments providing and assuring an interference fit with a workpiece to be chucked thereby, said embossments having peripheral work engaging surfaces and beveled ends leading to work engaging surfaces for guiding a workpiece onto said embossments, whereby a workpiece must be forced onto said embossments in chucking and in so doing stresses said flexible members and said embossments into arcuate form with said flexible members and said work engaging surfaces arched in the same direction, each embossment in the stressed condition being at the bottom of the facing inwardly from the arch of its respective flexible member and having a concave work engaging surface engaging the workpiece at axially spaced points to retain said workpiece without tilting and precisely coaxial to said tubular member, and a cam actuator operatively associated with said chuck and movable against said cam members to augment the pressure between said embossments and said workpiece normally exerted by the inherent resiliency of said flexible members.

8. An arbor chuck comprising a tubular member of a diameter to loosely receive a workpiece to be chucked, said tubular member having a plurality of longitudinal slots spaced substantially uniformly around the circumference thereof and circumferentially continuous rigid portions at the ends of said slots, said slots defining longitudinally extending radially flexible members and said members having embossments on one side and substantially midway between the ends thereof, said embossments having peripheral work engaging surfaces and said surfaces having axially spaced portions disposed different distances radially from the axis of the member and engageable with different parts of a two-diameter workpiece, the diameter of said tubular member at said embossments providing an interference fit with a workpiece to be chucked thereby, whereby a workpiece must be forced onto said embossments in chucking and in so doing stresses said flexible members and said embossments into arcuate form with said flexible members and said embossments arched in the same direction, each embossment in the stressed condition being at the bottom of and facing inwardly from the arch of its respective flexible member and said work engaging surfaces being engageable with the workpiece at spaced points to retain the workpiece without tilting and precisely coaxial to the member.

9. The arbor chuck as defined in claim 8 wherein said embossments are on the outside of said tubular member.

10. The arbor chuck as defined in claim 8 wherein said embossments are on the inside of said tubular member.

11. An arbor chuck comprising a tubular member of a diameter to loosely receive a workpiece to be chucked, said tubular member having a plurality of longitudinal slots spaced substantially uniformly around the circumference thereof and circumferentially continuous rigid portions at the ends of said slots, said slots defining longitudinally extending radially flexible members, said members having embossments on one side and substantially midway between the ends thereof and said embossments having peripheral work engaging surfaces, the work engaging surfaces of certain of said flexible members being of relatively large diameter and the other of said work engaging surfaces of relatively small diameter, said large diameter surfaces and said small diameter surfaces being relatively axially spaced and collectively adapted to engage different parts of a two-diameter workpiece, the diameter of said tubular member at said embossments providing an interference to fit with a workpiece to be chucked thereby and the said embossments having beveled ends leading to said work engaging surfaces for guiding a workpiece onto said embossments, whereby a workpiece must be forced onto said embossments in chucking and in so doing stresses said flexible members and said embossments into arcuate form with said flexible members and said embossments arched in the same direction, each embossment in the stressed condition being at the bottom of and facing inwardly from the arch of its respective flexible member and said work engaging surfaces being engageable with the workpiece at axially spaced points to retain the workpiece without tilting and precisely coaxial to said tubular member.

12. An arbor chuck comprising a tubular member of a diameter to loosely receive a workpiece to be chucked, said tubular member having a plurality of longitudinal slots spaced substantially uniformly around the circumference thereof and circumferentially continuous rigid portions at the ends of said slots, said slots defining longitudinally extending radially flexible members and said members having embossments on one side and substantially midway between the ends thereof and cam surfaces on the other side thereof opposite said embossments, said cam surfaces disposed concentrically around the axis of the tubular member and tapered toward one end thereof, said embossments having peripheral work engaging surfaces, the work engaging surfaces of certain of said flexible members being of relatively large diameter and the other of said work engaging surfaces being of relatively small diameter, said large diameter surfaces and said small diameter surfaces being relatively axially spaced and collectively adapted to engage different parts of a two-diameter workpiece, the diameter of said tubular member at said embossments providing an interference fit with a workpiece to be chucked thereby and said embossments having beveled ends leading to said work engaging surfaces for guiding a workpiece onto said embossments whereby a workpiece must be forced onto said embossments in chucking and in so doing stresses said flexible members and said embossments into arcuate form with said flexible members and said embossments arched in the same direction, each embossment in the stressed condition being at the bottom of and facing inwardly from the arch of its respective flexible member and said work engaging surface being engageable with the workpiece at axially spaced points to retain the workpiece without tilting and precisely coaxial to the member, and actuator means coactive with said cam surfaces to exert pressure thereagainst in the direction of said embossments to press the latter solidly against a workpiece on said work engaging surfaces.

13. An arbor chuck comprising a tubular body having a plurality of circumferentially spaced slots in an intermediate portion thereof and circumferentially continuous rigid portions at the ends of said slotted portion, said slots defining longitudinally extending, radially flexible members and said members in the free state being substantially straight and parallel to the axis of the arbor for the entire length of said members, each of said members having an embossment at one side and intermediate the ends thereof, said embossments collectively defining work-engaging and chucking means, said members also having cam surfaces on the other side thereof and said cam surfaces located with respect to said embossments so that pressure applied against said surfaces presses said embossments solidly against a workpiece disposed in operative association therewith.

14. An arbor chuck comprising a tubular body having a plurality of circumferentially spaced slots in an intermediate portion thereof and circumferentially continuous rigid portions at the ends of said slotted portion, said slots defining longitudinally extending, radially flexible members, said members in the free state being substantially straight and parallel to the axis of the arbor for the entire length of said members, said members having external embossments intermediate the ends thereof and said embossments collectively defining work engaging and chucking means, said members also provided with internal cam members and said cam members having cam surfaces disposed concentrically to the axis of the arbor and tapered toward one end thereof whereby pressure applied axially against said cam surfaces presses said embossments solidly against a workpiece on said embossments.

15. An arbor chuck comprising a tubular body having a plurality of circumferentially spaced slots in an intermediate portion thereof and circumferentially continuous rigid portions at the ends of said slotted portion, said slots defining longitudinally extending, radially flexible members, said members in the free state being substantially straight and parallel to the axis of the arbor for the entire length of said members, each of said members having axially spaced external embossments intermediate the ends thereof, said members also having internal cam members disposed axially between said pairs of embossments, said cam members having cam surfaces disposed concentrically around the axis of the arbor and tapered toward one end thereof so that pressure applied axially against said cam surfaces presses said embossments against a workpiece mounted thereon.

16. An arbor chuck comprising a tubular body adapted to extend through a hole in a workpiece and having a plurality of circumferentially spaced slots in an intermediate portion thereof and circumferentially continuous rigid portions at the ends of said slotted portion, said slots defining longitudinally extending radially flexible members and said members in the free state being substantially straight and parallel to the axis of the arbor for the entire length of said members, each of said members having a pair of axially spaced external embossments thereon, corresponding embossments of the members being aligned circumferentially around the arbor and said embossments collectively defining a work-engaging and chucking means, said body being smaller in diameter at one of said rigid portions and said flexible members than the diameter of the hole to be chucked so that the body is readily insertible into said hole, but the diameter of the said body at the embossments being normally greater than the diameter of said hole so that said members are flexed inwardly to a concave position from their normal rectilinear position when said embossments are inserted into the hole, arching of said members creating stresses therein, which press said embossments outwardly against said workpiece and said concave position of the members causing the embossments to concentrate pressure against the workpiece at spaced points, internal cam elements on said flexible members disposed axially between said pairs of embossments, said cam members having cam surfaces disposed concentrically to the axis of the body and tapered toward one end thereof, whereby pressure applied axially against said cam surfaces increases the pressure exerted by said embossments against the workpiece.

17. An arbor chuck comprising a tubular body adapted to extend through a hole in a workpiece and having a plurality of circumferentially spaced slots in an intermediate portion thereof and circumferentially continuous rigid portions at the ends of said slotted portion, said slots defining longitudinally extending radially flexible members and said members in the free state being substantially straight and parallel to the axis of the arbor for the entire length of said members, said members having external embossments thereon, said body being smaller in diameter at one of said rigid portions and at said flexible members than the diameter of the hole to be chucked so that the body is readily insertible into said hole, but the diameter of said body at the embossments being normally greater than the diameter of said hole so that said members are flexed inwardly to a concave position from their normal rectilinear position when said embossments are inserted into the hole, arching of said members creating stresses therein which press said embossments outwardly against said workpiece and said concave position of the members causing the embossments to concentrate pressure against the workpiece at spaced points, internal cam elements on said flexible members having cam surfaces disposed concentrically to the axis of the body and tapered toward one end thereof whereby pressure applied axially against said cam surfaces increases the pressure exerted by said embossments against said workpiece.

18. An arbor chuck comprising a tubular body having a plurality of circumferentially spaced slots in an intermediate portion thereof and circumferentially continuous rigid portions at the ends of said slotted portion, said slots defining longitudinally extending, radially flexible members and said members in the free state being substantially straight and parallel to the axis of the arbor for the entire length of said members, each of said members having an embossment on one side and intermediate the ends thereof, said embossments collectively defining work engaging and chucking means, said members also having cam surfaces on the other side thereof and said cam surfaces located with respect to said embossments so that pressure applied against said surfaces presses said embossments solidly against a workpiece disposed in operative association therewith, a pressure member movable longitudinally relative to said arbor and disposed to engage said cam surfaces when moved axially in one direction, and actuator means cooperating with said pressure member to move the same into and out of pressed engagement with said cam surfaces.

19. An arbor chuck comprising a tubular body having a plurality of circumferentially spaced slots in an intermediate portion thereof and circumferentially continuous rigid portions at the ends of said slotted portion, said slots defining longitudinally extending, radially flexible members, said members in the free state being substantially straight and parallel to the axis of the arbor for the entire length of said members, said members having external embossments intermediate the ends thereof and said embossments collectively defining work engaging and chucking means, said members also provided with internal cam members and said cam members having cam surfaces disposed concentrically to the axis of the arbor and tapered toward one end thereof, whereby pressure applied axially against said cam surfaces presses said embossments solidly against a workpiece on said embossments, a pressure member in the arbor movable axially against said cam surfaces to expand said flexible members, and means coactive with said pressure member to force the same axially against said cam surfaces.

20. An arbor chuck comprising a tubular body having a plurality of circumferentially spaced slots in an intermediate portion thereof and circumferentially continuous rigid portions at the ends of said slotted portion, said slots defining longitudinally extending, radially flexible members, said members in the free state being substantially straight and parallel to the axis of the arbor for the entire length of said members, said members having external embossments intermediate the ends thereof and said embossments collectively defining a work engaging and chucking means, said members also provided with internal cam members and said cam members having cam surfaces disposed concentrically to the axis of the arbor and tapered toward one end thereof whereby pressure applied axially against said cam surfaces presses said embossments against a workpiece on said embossments, an axially adjustable screw in said tubular body at one end thereof, and a pressure member confined between the screw and said cam members, said pressure member being movable by said screw to engage said cam surfaces and adapted to transfer pressure exerted thereon by said screw against said cam surfaces whereby to expand said flexible members into pressed engagement with said workpiece.

References Cited in the file of this patent

UNITED STATES PATENTS

| | | |
|---|---|---|
| 761,348 | Baines | May 31, 1904 |
| 1,597,404 | Crossley | Aug. 24, 1926 |
| 1,644,335 | Groenebaum | Oct. 4, 1927 |
| 1,919,239 | McFall | Jan. 25, 1933 |
| 2,101,846 | Goordman | Dec. 14, 1937 |
| 2,459,453 | Rieber | Jan. 18, 1949 |
| 2,626,811 | Hohwart | Jan. 27, 1953 |
| 2,777,701 | Hohwart | Jan. 15, 1957 |
| 2,803,159 | Hohwart | Aug. 20, 1957 |